US011138788B2

(12) United States Patent
Oota et al.

(10) Patent No.: US 11,138,788 B2
(45) Date of Patent: Oct. 5, 2021

(54) THREE-DIMENSIONAL MODEL CREATOR

(71) Applicant: Fanuc Corporation, Yamanashi (JP)

(72) Inventors: Rie Oota, Yamanashi (JP); Mamoru Kubo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 56 days.

(21) Appl. No.: 16/532,767

(22) Filed: Aug. 6, 2019

(65) Prior Publication Data

US 2020/0051331 A1 Feb. 13, 2020

(30) Foreign Application Priority Data

Aug. 8, 2018 (JP) .............................. JP2018-149552

(51) Int. Cl.
*G06T 17/10* (2006.01)
*G06T 7/90* (2017.01)

(52) U.S. Cl.
CPC ................ *G06T 17/10* (2013.01); *G06T 7/90* (2017.01); *G06T 2207/30164* (2013.01)

(58) Field of Classification Search
CPC . G06T 17/10; G06T 7/90; G06T 2207/30164; G06T 19/20; G06T 2219/2008; G06T 2219/008; G05B 19/401; G05B 2219/34242
See application file for complete search history.

(56) References Cited

U.S. PATENT DOCUMENTS

| 7,403,648 | B2 | 7/2008 | Nakamura |
| 9,696,714 | B2 * | 7/2017 | Kunimitsu ......... G05B 19/4097 |
| 2017/0173798 | A1 | 6/2017 | Watanabe et al. |
| 2018/0300531 | A1 * | 10/2018 | Chang ................. G06F 3/04815 |

FOREIGN PATENT DOCUMENTS

| JP | 2006102923 A | 4/2006 |
| JP | 4083554 B2 | 4/2008 |
| JP | 4456455 B2 | 4/2010 |
| JP | 2015009314 A | 1/2015 |
| JP | 6043234 B2 | 12/2016 |
| WO | WO 2006/026392 A2 * | 3/2006 ............. G01R 27/28 |

OTHER PUBLICATIONS

Japanese Notice of Reasons for Refusal for Japanese Application No. 2018-149552, dated Mar. 16, 2021 with translation, 7 pages.

* cited by examiner

*Primary Examiner* — Maurice L. McDowell, Jr.
*Assistant Examiner* — Donna J. Ricks
(74) *Attorney, Agent, or Firm* — RatnerPrestia

(57) ABSTRACT

A three-dimensional model creator creates individual models indicative of individual shapes of at least two objects from an integrated model created based on data obtained by imaging or measuring the objects together. The three-dimensional model creator creates a plurality of division models by dividing the integrated model with extension planes obtained by extending surfaces that define the integrated model, identifies two-dimensional regions in which the objects exist individually, based on the obtained data, tags the division models based on projections of the division models and the two-dimensional regions, and creates the individual models of the objects from the tagged division models.

4 Claims, 9 Drawing Sheets

IMAGE DATA
MEASUREMENT DATA

IMAGE DATA
MEASUREMENT DATA

3D MODEL

DIVISION MODEL

DIVISION MODEL (3D)

PROJECTION (2D) OF EACH DIVISION MODEL
PROJECTION (2D)

THREE-DIMENSIONAL MODEL CREATOR

RELATED APPLICATIONS

The present application claims priority to Japanese Patent Application Number 2018-149552 filed on Aug. 8, 2018, the disclosure of which is hereby incorporated by reference herein in its entirety.

BACKGROUND OF THE INVENTION

Field of the Invention

The present invention relates to a three-dimensional (3D) model creation device, and more particularly, to a three-dimensional model creation device configured to create interference check data from images.

Description of the Related Art

There are technologies for detecting interference between machine tool structures, tools and workpieces. A three-dimensional interference check function as a conventional technology for detecting the interference is generally based on a method in which a three-dimensional shape of an object of interference check is represented by a combination of stereo models, such as cuboids and cylinders, and three-dimensional simulation is performed to check to see if the stereo models interfere with one another.

In checking the interference by using the three-dimensional interference check function, three-dimensional models created by CAD (computer-aided design) are required as three-dimensional simulation data. However, a workpiece to be machined and a jig used to fix the workpiece vary for each machining process by means of a machine tool, so that the three-dimensional models must be created by an operator on each occasion. Moreover, although the workpiece changes its shape as it is machined by a tool (or contacts the tool), the jig never changes its shape in general and is an object whose contact with the tool should be determined to be interference. Thus, the workpiece and the jig should be created as separate three-dimensional models.

Japanese Patent No. 4083554 teaches, as a technology for supporting the creation of three-dimensional models, a method in which image data are generated by individually imaging structures that constitute a machine tool in the directions of X-, Y- and Z-axes by means of two cameras, and three-dimensional shape data of the structures are generated based on the individual image data.

Moreover, Japanese Patent No. 4456455 teaches a technology in which shapes are detected from respective images of a chuck and a workpiece in a lathe in attached and non-attached states to calculate interference regions.

Furthermore, Japanese Patent No. 6043234 teaches a technology in which an individual model of a jig is generated based on a three-dimensional model of a workpiece and data obtained by integrally measuring the shapes of the workpiece and the jig by three-dimensional measurement.

In the conventional technology taught in Japanese Patent No. 4083554, however, the workpiece and the jig are inevitably created as an integrated three-dimensional model and cannot be distinguished by this three-dimensional model. Thus, the workpiece and the jig cannot be discriminated in an interference check.

Moreover, in the technology taught in Japanese Patent No. 4456455, the respective images of the workpiece and the chuck (or the jig) in the attached and non-attached states must be captured separately in creating the three-dimensional model, so that it cannot be thought that the time and labor for the creation of the three-dimensional model are fully reduced.

Furthermore, in the technology taught in Japanese Patent No. 6043234, the three-dimensional model of the jig is cut out from the integrated three-dimensional model combining the workpiece and the jig by using the three-dimensional model of the workpiece. However, the three-dimensional model of the workpiece must be separately created by an operator using CAD. Thus, the operator must create the three-dimensional model of the workpiece, although he/she will not be troubled by the creation of the three-dimensional model of the jig.

SUMMARY OF THE INVENTION

Accordingly, the object of the present invention is to provide a three-dimensional model creator capable of automatically creating three-dimensional models of a workpiece and a jig from imaging or measurement data.

A three-dimensional model creation device of the present invention, which creates individual models indicative of individual shapes of at least two objects from an integrated model created based on data obtained by imaging or measuring the objects together, comprises a three-dimensional model division processing unit configured to create a plurality of division models by dividing the integrated model with extension planes obtained by extending surfaces that define the integrated model, a region determination unit configured to identify two-dimensional regions in which the objects exist individually, based on the obtained data, and an individual model creation unit configured to tag the division models based on projections of the division models and the two-dimensional regions and create the individual models of the objects from the tagged division models.

In an embodiment of the three-dimensional model creation device of the present invention, the objects include a workpiece and a jig.

In an embodiment of the three-dimensional model creation device of the present invention, the region determination unit identifies the two-dimensional regions based on luminance information or color information on captured images of the objects.

In an embodiment of the three-dimensional model creation device of the present invention, the individual model creation unit attaches tags indicative of the identified objects to the division models, depending on the degree of superimposition between the projections of the division models and the two-dimensional regions of the identified objects.

According to the present invention, there can be provided a three-dimensional model creator capable of automatically creating three-dimensional models of a workpiece and a jig from imaging or measurement data.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A configuration example of a three-dimensional model creator implementing the present invention will be described below.

Figure 1:
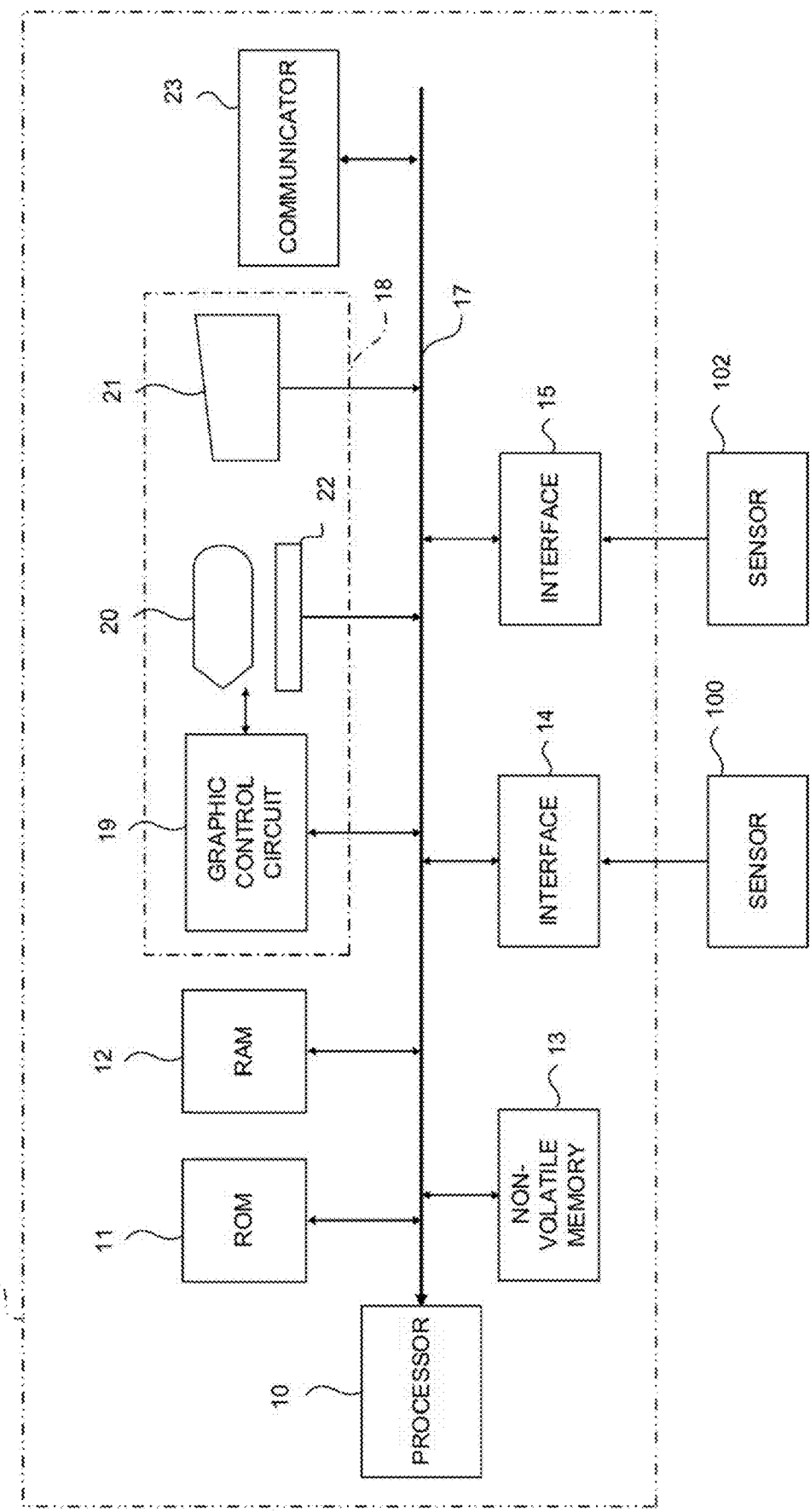
FIG. 1 is a schematic hardware configuration diagram showing principal parts of a three-dimensional model creator according to one embodiment of the present invention.

FIG. 1 is a schematic hardware configuration diagram showing principal parts of a three-dimensional (3D) model creator 1 according to one embodiment of the present invention. The three-dimensional model creator 1 according to the present embodiment can be implemented as a numerical controller, for example. Moreover, the three-dimensional model creation device 1 according to the present embodiment can be implemented as a personal computer or the like that is installed together with, for example, a machine tool. Furthermore, the three-dimensional model creator 1 according to the present embodiment can also be implemented as an interference check device or the like that is installed together with, for example, a machine tool. FIG. 1 shows an example of the hardware configuration of the three-dimensional model creator 1 implemented as the personal computer.

The three-dimensional model creator 1 comprises a processor 10 as a central component. Individual constituent elements of the three-dimensional model creator 1 are connected by a bus 17 and exchange data with one another via the bus 17. The processor 10 controls the entire three-dimensional model creator 1 according to a system program stored in a ROM (read-only memory) 11. As the ROM 11, an EPROM (erasable programmable read-only memory), an EEPROM (electrically-erasable programmable read-only memory), or the like can be used.

A DRAM (dynamic RAM) or the like can be used as a RAM (random access memory) 12, which is loaded with temporary calculation data, display data, input and output signals and so on. As a non-volatile memory 13, CMOS (complementary MOS), a SRAM (static RAM) or the like backed up by a battery (not shown) can be used. The non-volatile memory 13 stores parameters and the like to be retained even after the power is turned off.

A machine control panel 18 located, for example, on the front face of the three-dimensional model creator 1 accepts display of data and graphics required for the operation of the 3D model creator 1, an operator's manual operation input, data input, and the like and is used for the operation of the 3D model creator 1. A graphic control circuit 19 converts digital signals, such as numerical data and graphic data, to raster signals for display and delivers them to a display 20. The display 20 then displays these numerical values and graphics. A liquid-crystal display device is mainly used as the display 20.

An input device 21 comprises a keyboard, equipped with key switches, rotary switches, numeric keys, symbolic keys, character keys and function keys, and a pointing device such as a mouse.

A touch panel 22 has a function of detecting an operation, such as touching or dragging, performed by the operator. The touch panel 22 is superimposed on the screen of the display 20 so that it can detect his/her operation of a software key, software button and software switch displayed on the screen of the display 20. Alternatively, the touch panel 22 and the display 20 may be constructed together as a single unit.

A communicator 23 performs data communication between a numerical controller, an interference check device, a cell computer, a host computer and the like, via a wired/wireless network. Three-dimensional model data created in the three-dimensional model creator 1 are transmitted to numerical controller through the communicator 23 or the like.

An interface 14 is an interface through which data obtained by imaging or measurement by a sensor 100 are introduced into the three-dimensional model creator 1. The sensor 100 may be any sensor that can acquire data for creating a three-dimensional model. A camera or a distance sensor can be used, for example, as the sensor 100. More preferably, the sensor 100 used can be a three-dimensional distance image camera, a stereo vision or the like that can acquire an image of an object to be imaged and the distance of each pixel of the image from its imaging position.

An interface 15 is an interface through which data obtained by imaging by a sensor 102 are introduced into the three-dimensional model creator 1. The sensor 102 may be any sensor that can acquire information usable for discrimination of a workpiece and a jig. In some cases, the luminance and color (optical wavelength) of the surface may vary depending on, for example, the difference in material between the workpiece and the jig. Therefore, a camera can be typically used as the sensor 102. Information on the luminance, the color (optical wavelength) and the like is obtained from image data acquired by the camera. Moreover, the variation of the optical wavelength due to the material variation can be more precisely discriminated by using a high-performance camera, such as a hyperspectral camera. Preferably, the sensor 102 is configured to output parameters, such as the angle of view, the camera direction, and the distance from the subject at the time of imaging, to the outside. Alternatively, the sensor 102 is preferably used in a previously calibrated state such that the parameters are identified.

The sensors 100 and 102 may be devices independent of each other. Alternatively, a single device may be used to serve as both the sensors 100 and 102.

Figure 2:
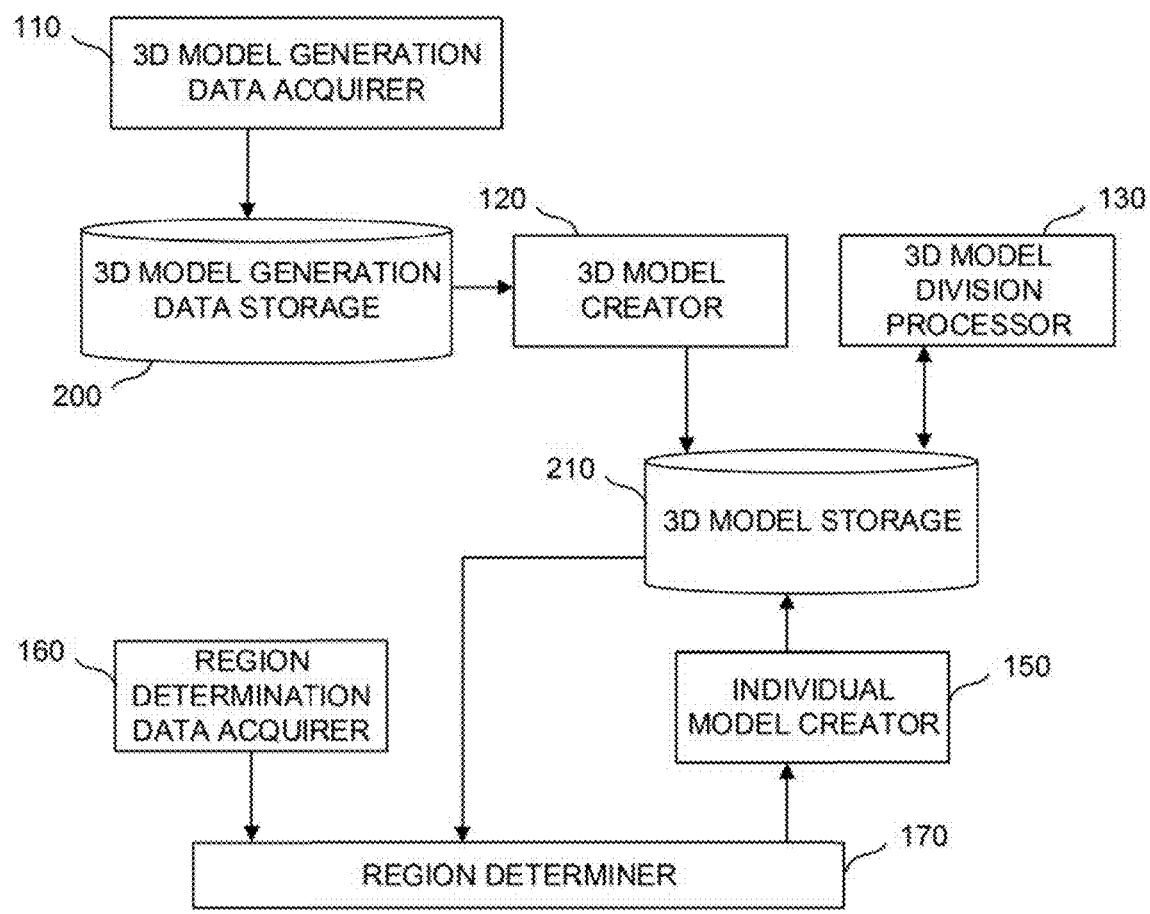
FIG. 2 is a schematic functional block diagram of the three-dimensional model creator according to an embodiment of the present invention.

FIG. 2 is a schematic functional block diagram showing principal parts of the three-dimensional model creator according to one embodiment of the present invention for the case where the system program for implementing a three-dimensional model creation function of the present invention is performed on the 3D model creator 1 shown in FIG. 1. Functional blocks shown in FIG. 2 are implemented as the processor 10 in the three-dimensional model creator 1 shown in FIG. 1 performs the system program for the three-dimensional model creation function and controls the operations of the individual parts of the 3D model creator 1. The three-dimensional model creator 1 of the present embodiment comprises a three-dimensional (3D) model generation data acquirer 110, a three-dimensional (3D) model creator 120, a three-dimensional (3D) model division processor 130, an individual model creator 150, a region determination data acquirer 160 and a region determiner 170. Moreover, on the non-volatile memory 13 in the three-dimensional model creator 1, a three-dimensional (3D) model generation data storage 200 and a three-dimensional (3D) model storage 210 are secured. The 3D model generation data storage 200 serves to store images obtained by imaging or measuring together the workpiece and the jig on which the workpiece is mounted. The 3D model storage 210 serves to store the three-dimensional model.

Figure 6:
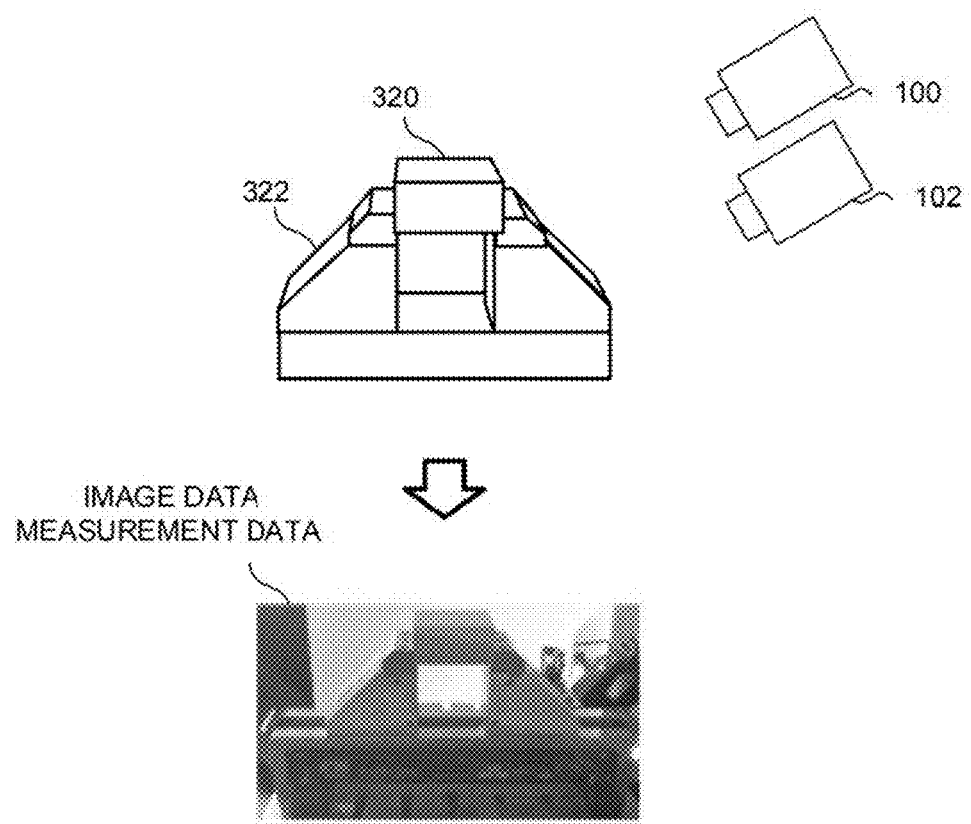
FIG. 6 is a view showing a processing performed by a three-dimensional model generation data acquirer and a region determination data acquirer.

The three-dimensional model generation data acquirer 110 is a functional means configured to acquire the data obtained by the imaging or measurement by the sensor 100 and load the data into the three-dimensional model generation data storage 200 (refer to FIG. 6). The 3D model generation data acquirer 110 may be configured to load a plurality of data sets acquired by imaging or measuring a workpiece 320 and a jig 322 on which the workpiece 320 is mounted, as shown in FIG. 6, for example, by the sensor 100 in a plurality of directions into the 3D model generation data storage 200.

Figure 7:
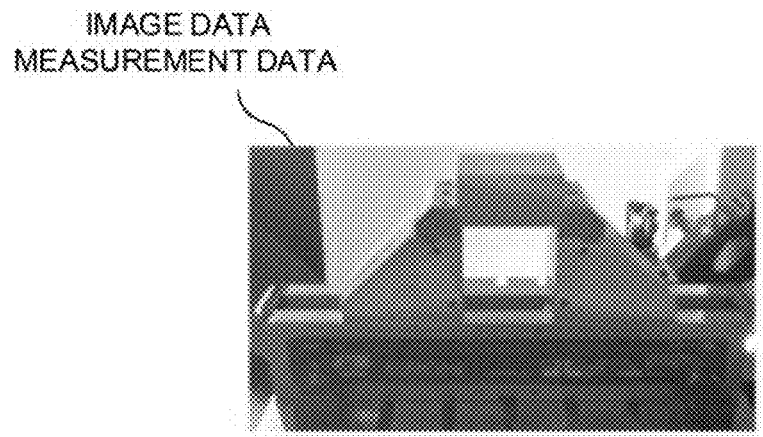
FIG. 7 is a view showing processings performed by a three-dimensional model creator and a three-dimensional model division processor.
Figure 7:
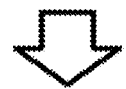
Figure 7:
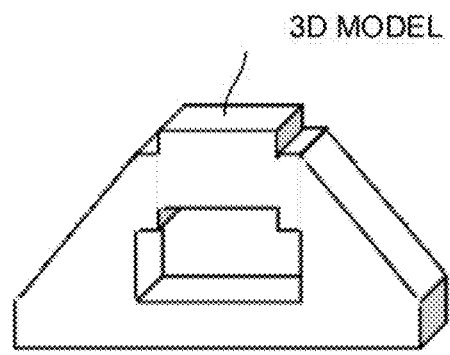
Figure 7:
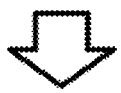
Figure 7:
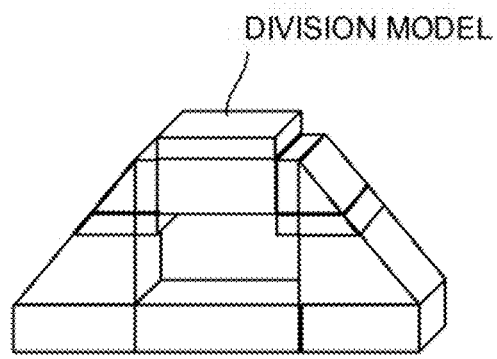

The three-dimensional model creator 120 is a functional means configured to create the three-dimensional model from data obtained by imaging or measuring together the workpiece 320 and the jig 322 on which the workpiece 320 is mounted and stored in the three-dimensional model generation data storage 200 (refer to FIG. 7). The 3D model creator 120 loads the three-dimensional model created from the data stored in the 3D model generation data storage 200, as an integrated model combining the workpiece 320 and the jig 322, into the three-dimensional model storage 210.

Various methods, such as the volume intersection method and stereo matching method, are generally known as methods for creating a three-dimensional model from images as data. However, the method for creating the three-dimensional model by means of the three-dimensional model creator 120 may be any method that can create the three-dimensional model, based on the result of the imaging or measurement of the workpiece 320 acquired by some means and the jig 322 on which the workpiece 320 is mounted.

The following is a brief description of a method using three-dimensional distance images, as an example for the three-dimensional model creation by the three-dimensional model creator 120. In this method, the three-dimensional model generation data acquirer 110 is first used to load the three-dimensional model generation data storage 200 with a plurality of distance images that are obtained by imaging together, by means of the three-dimensional distance image camera, stereo vision or the like as the sensor 100, the workpiece 320 and the jig 322 on which the workpiece 320 is mounted, in a plurality of directions. If the three-dimensional distance image camera is used to capture distance images, it may be previously installed in a predetermined position or attached to, for example, the spindle of a machine tool or a robot that is installed together with the machine tool so that the three-dimensional distance image camera can be axially moved to the predetermined position for imaging. Moreover, if the stereo vision is used to acquire the images of the subject, as shown in FIG. 3, the distance images are obtained according to the following procedures.

[Procedure a1] Feature points are detected in images.

Figure 3:
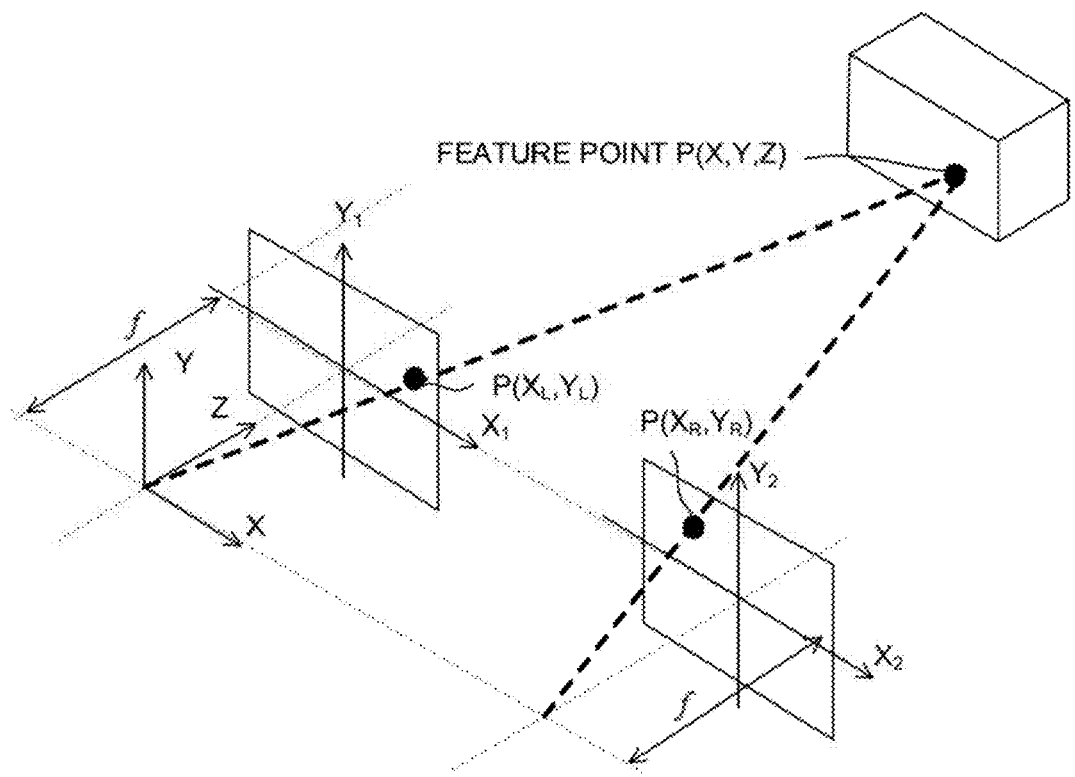
FIG. 3 is a diagram illustrating a method for creating a three-dimensional model by a stereo vision.

[Procedure a2] The feature points are associated between the images (a right-eye image $(X_R, Y_R)$ and a left-eye image $(X_L, Y_L)$ in FIG. 3).

[Procedure a3] On the basis of the detected feature points, a three-dimensional position is calculated according to the following formulae:

$$X=\{B/(X_L-X_R)\}*X_L$$

$$Y=\{B/(X_L-X_R)\}*Y_L$$

$$Z=\{B/(X_L-X_R)\}*f$$

where terms f and B are a focal length and a baseline length, respectively.

For a plurality of distance images obtained in this manner, the three-dimensional model creator 120 aligns the images captured by parallel translation and rotation with the same coordinate system. Using the plurality of distance images aligned with the same coordinate system, the 3D model creator 120 obtains a signed distance on a voxel to create a mesh by the marching cubes method.

Moreover, the three-dimensional model creator 120 creates a three-dimensional model simplified according to the following procedures for the mesh created in the above manner.

[Procedure b1] The normal line to each mesh surface of the three-dimensional model is calculated.

[Procedure b2] An outer product is calculated for normal lines to adjacent surfaces.

[Procedure b3] If the calculated outer product is not higher than a predetermined threshold, the adjacent surfaces are regarded as identical and are synthesized.

Figure 4:
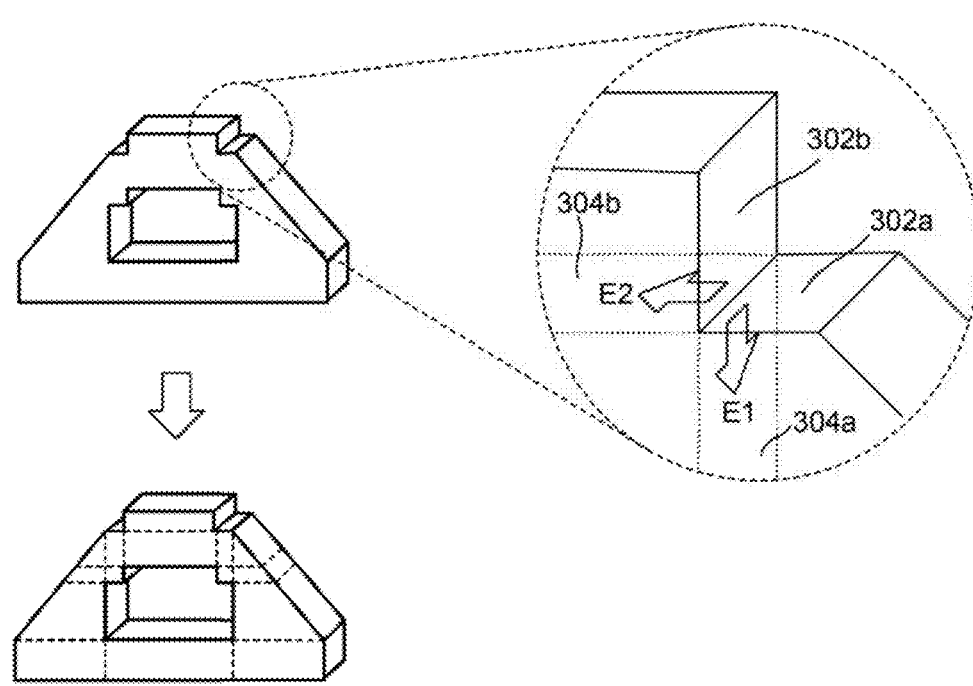
FIG. 4 is a view showing an example of a method for dividing an integrated model.

The three-dimensional model division processor 130 is a functional means configured to create, based on the integrated model combining the workpiece 320 and the jig 322 stored in the three-dimensional model storage 210, division models by dividing each part of the integrated model (refer to FIG. 7). The 3D model division processor 130 divides the integrated model along extension planes 304a and 304b obtained by respectively extending surfaces 302a and 302b that define the integrated model in the direction of respective arrows E1 and E2, as shown in FIG. 4. The 3D model division processor 130 loads into the division models the 3D model storage 210, the division models being obtained by dividing the integrated model stored in the 3D model storage 210.

Figure 5:
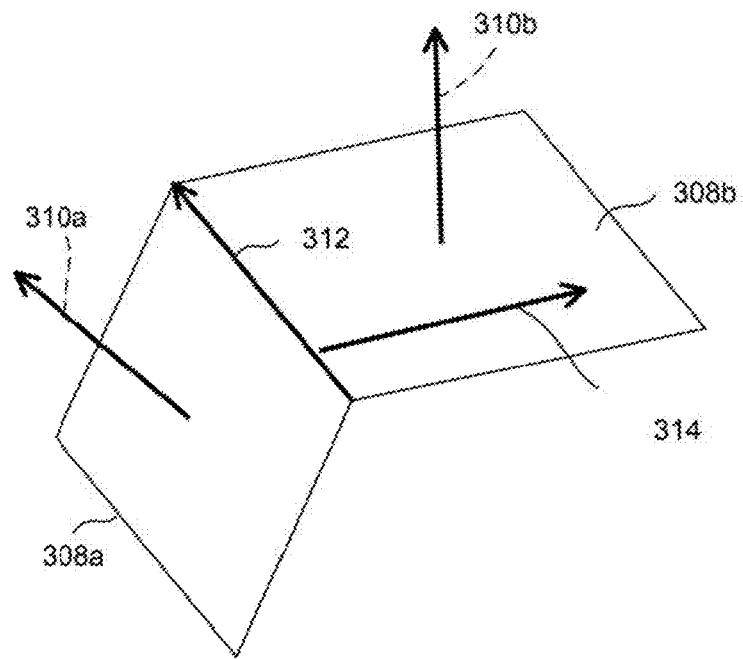
FIG. 5 is a view showing an example of a method for discriminating concave and convex edges.

Various algorithms are available for an algorithm of division of the integrated model by the three-dimensional model division processor 130. As an example of the division algorithm, it may be determined whether an edge (borderline on which surfaces contact each other) at each part of the integrated model is concave or convex so that the surfaces can be extended to a position in which another edge is crossed in the binormal direction (positive or negative direction of a binormal vector) of the surface in contact with the concave edge to divide the model at the crossing point. If this method is employed, the 3D model division processor 130 determines whether the edge (borderline on which the surfaces contact each other) at each part of the integrated model is concave or convex according to the following procedures, for example (refer to FIG. 5).

[Procedure c1] Respective normal vectors 310a and 310b (toward the obverse side of an object) of first and second surfaces 308a and 308b (of which the second surface 308b is a surface on the right of the edge vector as viewed from the obverse side of the object) in contact with the edge to be discriminated are obtained.

[Procedure c2] A binormal vector 314 is obtained for the normal vector 310b of the second surface 308b and an edge vector 312.

[Procedure c3] The inner product of the normal vector 310a of the first surface 308a and the obtained binormal vector 314 is obtained. If the inner product is negative, the edge is determined to be convex. If the inner product is positive, the edge is determined to be concave.

Since the above three-dimensional model division algorithm is already well-known from "Decomposition of a Welded Part by Interactive Loop Generation Based on Multiple Feature Recognition" (Journal of the Japan Society for Precision Engineering, Vol. 62, No. 12, pp. 1707-1711 by TaeSung Yoon et al., The Japan Society for Precision Engineering), or the like, a further detailed description thereof is omitted herein.

The region determination data acquirer 160 is a functional means configured to acquire data obtained by imaging or measuring the workpiece 320 and the jig 322 by means of the sensor 102 (refer to FIG. 7). The region determination data acquirer 160 can acquire image data including, for example, luminance information, color information, depth information, or X-ray transmittance information.

Figure 8:
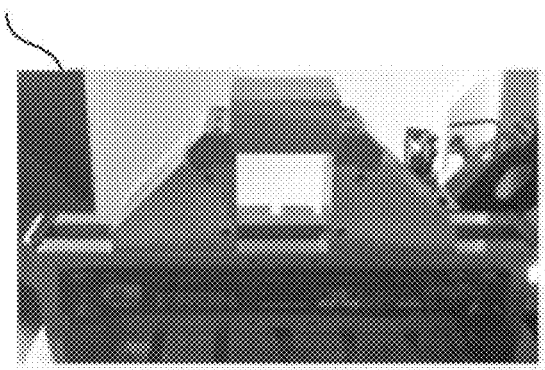
FIG. 8 is a view showing a processing performed by a region determiner.
Figure 8:
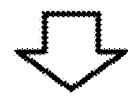
Figure 8:
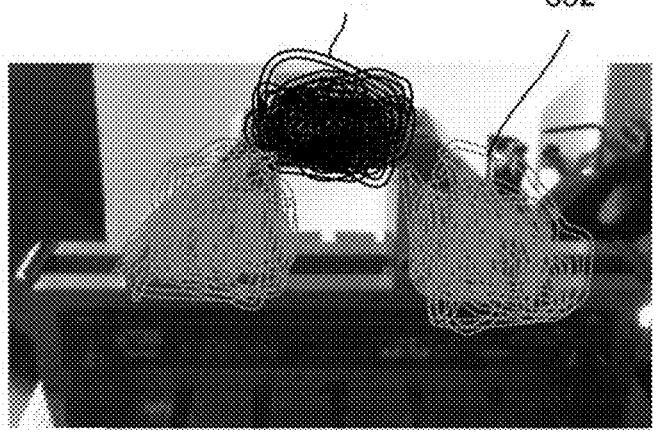

The region determiner 170 is a functional means configured to discriminate a region 330 located with the workpiece 320 and a region 332 located with the jig 322, among the image data acquired by the region determination data acquirer 160 (refer to FIG. 8). The region determiner 170 may be configured to discriminate the region 330 located with the workpiece 320 and the region 332 located with the jig 322 by any method that is based on various pieces of information included in the image data acquired by the region determination data acquirer 160, such as the luminance information, color information and the like.

The following is a description of a method, as an example, in which the region determiner 170 discriminates the region 330 located with the workpiece 320 and the region 332 located with the jig 322 by using the luminance or color information. If different material qualities (including different materials and surface treatment manners) are used for the workpiece 320 and the jig 322, the luminance or color (optical wavelength) in the image data may sometimes vary between the two items. In this case, the region determiner 170 identifies a region in which a pixel having a luminance or color (optical wavelength) peculiar to the workpiece exists and a region in which a pixel having a luminance or color (optical wavelength) peculiar to the jig exists, among the image data acquired by the region determination data acquirer 160. The reference values of the luminance or color peculiar to the workpiece and the luminance or color (optical wavelength) peculiar to the jig are assumed to be previously held by the region determination unit 170. The region determiner 170 can identify a pixel having a luminance or color (optical wavelength) within a fixed range from the defined reference values as the region 330 located with the workpiece 320 or the region 332 located with the jig 322.

The following is a description of a method, as another example, in which the region determiner 170 discriminates the region 330 located with the workpiece 320 and the region 332 located with the jig 322 by shape determination. This method is effective if the workpiece 320 and the jig 322 have certain characteristic shapes. In this case, the region determiner 170 holds a learning model having learned features of the shapes of the workpiece 320 and the jig 322 by a known machine learning method so that it can determine whether the created division model is the workpiece 320 or the jig 322 by using this learning model.

The individual model creator 150 is a functional means configured to individually tag that one of the division models created by the three-dimensional model division processor 130 which is equivalent to the workpiece 320 or the jig 322, based on the results of discrimination of the regions 330 and 332 located with the workpiece and the jig by the region determiner 170, and create an individual model, which is a single model based on division models with the same tag.

Figure 9:
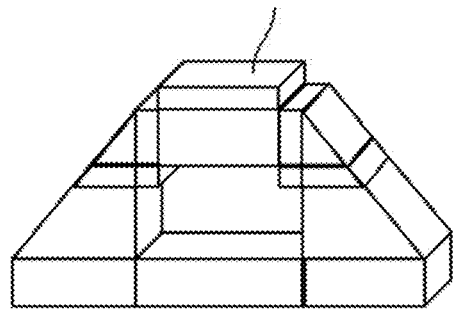
FIG. 9 is a view showing a processing performed by an individual model creator.
Figure 9:
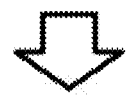
Figure 9:
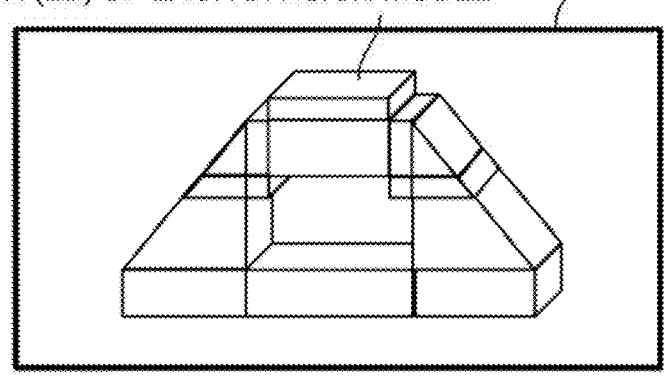

The following is a description of tagging processing by the individual model creator 150. The individual model creator 150 calculates a projection (two-dimensional projection image) of the division model created by the three-dimensional model division processor 130 (refer to FIG. 9). In doing this, the individual model creator 150 calculates the projection by using the imaging parameters (angle of view, camera direction, distance from the subject, etc.) of the sensor 102 so that the images acquired by the sensor 102 and the projection of the division model are similarly perspective. Specifically, the following relationship holds:

$$x=PX,$$

where lowercase x is a coordinate on the image data acquired by the region determination data acquirer 160, uppercase X is a coordinate on the division model, and P is an imaging parameter of the sensor 102.

Figure 10:
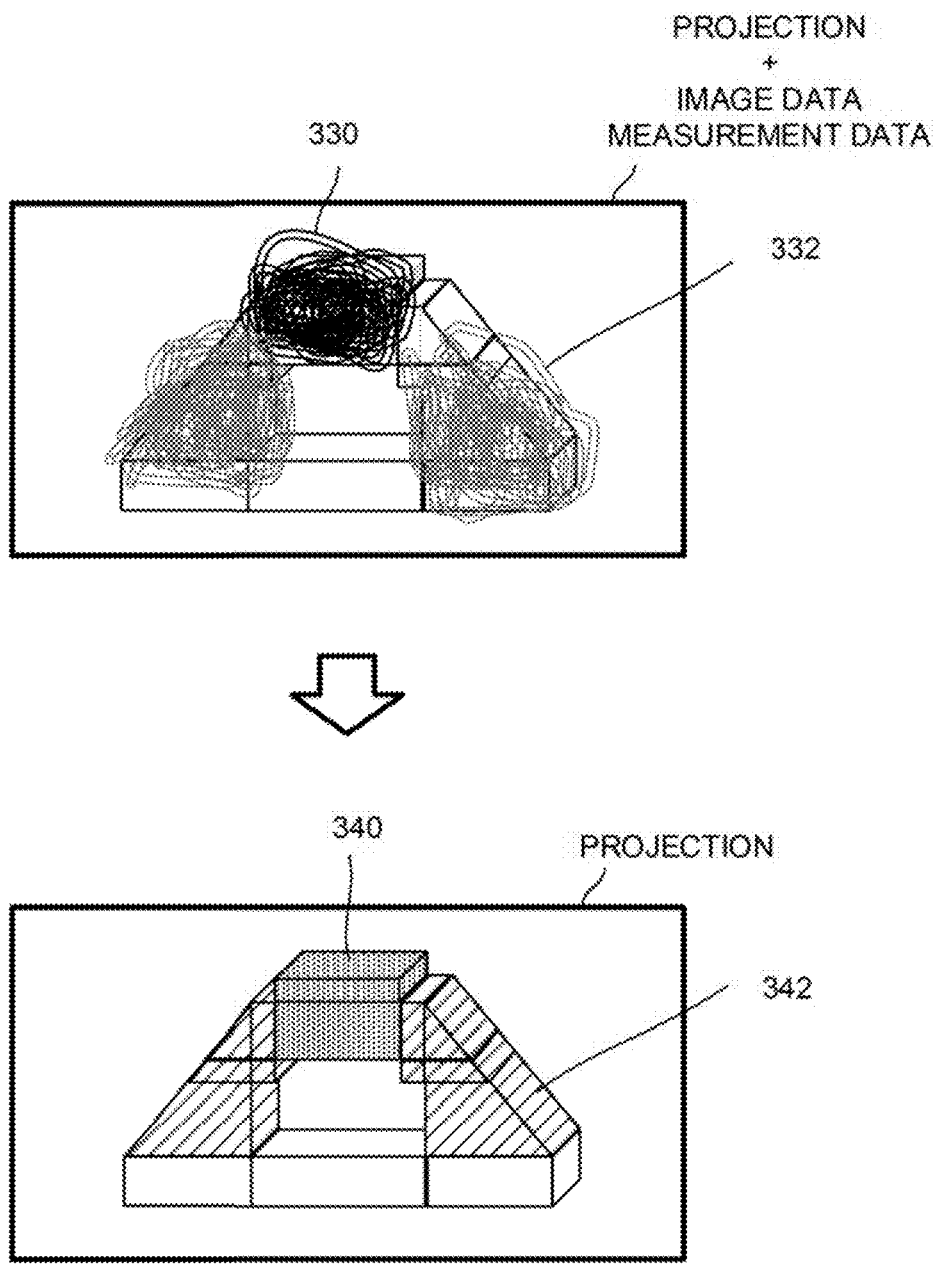
FIG. 10 is a view showing a processing performed by the individual model creator.

The individual model creator 150 superimposes the image data acquired by the region determination data acquirer 160 and the projection images of all the division models. Specifically, the individual model creator 150 overlays the images of the workpiece 320 and the jig 322 on each other so that their outlines are coincident. The workpiece is tagged for those pixels of the projection images which are included in the region 330 for the workpiece 320 determined by the region determiner 170. The jig 322 is tagged for the pixels included in the region 332 for the jig (refer to FIG. 10). In the drawing, pixels tagged on the workpiece are designated by numeral 340, and those on the jig by numeral 342.

Figure 11:
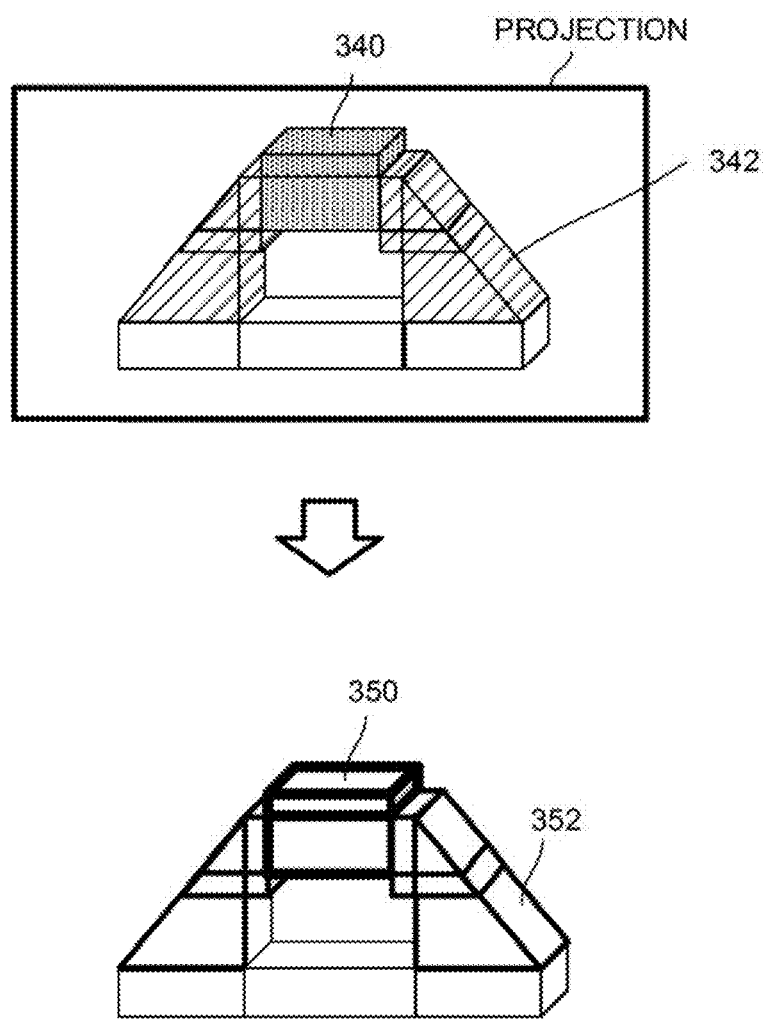
FIG. 11 is a view showing a processing performed by the individual model creator.

The individual model creator 150 attaches tags for the workpiece or the jig to the division model concerned, depending on the degree of superimposition between the pixels constituting the projection of the division model and the region for the workpiece or the jig. For example, the individual model creator 150 attaches the tags for the workpiece to the three-dimensional division model concerned if those of the pixels constituting the projection of the three-dimensional division model which exceed a predetermined percentage are tagged on the workpiece (refer to FIG. 11). Likewise, the individual model creator 150 attaches the tags for the jig to the three-dimensional division model concerned if those of the pixels constituting the projection of the three-dimensional division model which exceed the predetermined percentage are tagged on the jig. Let us assume, for example, that when a certain three-dimensional division model is projected to generate a two-dimensional image, 80 percent of the pixels of the projection image are tagged on the workpiece, 10 percent are tagged on the jig, and the remaining 10 percent are unknown (or not tagged). In this case, jig tags may be attached to the pixels with unknown or no tags for the sake of safety and so on. If this is done, then 80 percent of the pixels of the projection image are tagged on the workpiece and 20 percent are tagged on the jig. If there is a rule that the tags of the greater number attached to the pixels are employed as the tags for the division model, for example, then the individual model creator 150 attaches workpiece tags to the three-dimensional division model in this case. The individual model creator 150 sequentially performs similar processing for all the division models.

The following is a description of individual model creation processing by the individual model creator 150. The individual model creator 150 creates an individual workpiece model from a division model 350 tagged on the workpiece and creates an individual jig model from a division model 352 tagged on the jig. The individual model creator 150 may be configured to create a plurality of individual models corresponding to the same tag if the division models with the same tag are not in contact with one another. The individual model creator 150 loads the individual model into the three-dimensional model storage 210, the individual model being obtained from the division models stored in the 3D model storage 210.

In this way, the individual models of the workpiece, jig, and the like created by the three-dimensional model creator 1 of the present embodiment and stored in the three-dimensional model storage 210 are utilized in a machining simulation function and interference check function of the numerical controller, interference check device and the like.

While an embodiment of the present invention has been described herein, the invention is not limited to the above embodiment and may be suitably modified and embodied in various forms.

For example, in the above embodiment, the individual models of the workpiece and the jig are illustrated as being created from the integrated model combining the workpiece and the jig on which the workpiece is mounted. Alternatively, however, individual models of a tool and a spindle may be created from an integrated model combining the tool and the spindle, for example.

The invention claimed is:

1. A three-dimensional model creator creating individual models indicative of individual shapes of at least two objects from an integrated model created based on data obtained by imaging the objects together, comprising:
    a processor configured to:
    create, based on the integrated model combining the at least two objects, a plurality of three-dimensional division models by dividing each part of the integrated model along extension planes obtained by respectively extending surfaces defining the integrated model;
    individually identify two-dimensional regions where the each of the at least two objects exist, based on the obtained data; and
    tag the three-dimensional division models based on projections of the three-dimensional division models and the identified two-dimensional regions, wherein the projections are calculated using imaging parameters of a sensor to provide a two-dimensional image projection of the three-dimensional division models and the identified two-dimensional regions, and create the individual models for each of the at least two objects from the tagged three-dimensional division models.

2. The three-dimensional model creator according to claim 1, wherein the objects include a workpiece and a jig.

3. The three-dimensional model creator according to claim 1, wherein the processor is further configured to identify the two-dimensional regions based on luminance information or color information on captured images of the objects.

4. The three-dimensional model creator according to claim 1, wherein the processor is further configured to attach tags indicative of the identified objects to the three-dimensional division models, depending on the degree of superimposition between the projections of the three-dimensional division models and the two-dimensional regions of the identified objects.

\* \* \* \* \*